United States Patent [19]

Lathrop

[11] Patent Number: 5,356,653
[45] Date of Patent: Oct. 18, 1994

[54] REDUCED CALORIE BAKERY FILLINGS

[75] Inventor: Patrick J. Lathrop, Seattle, Wash.

[73] Assignee: Bunge Foods Corporation, Seattle, Wash.

[21] Appl. No.: 866,324

[22] Filed: Apr. 9, 1992

[51] Int. Cl.⁵ .............................................. A23L 1/05
[52] U.S. Cl. ................................. 426/573; 426/578; 426/804; 426/653
[58] Field of Search ............... 426/573, 575, 577, 615, 426/804, 653, 578

[56] References Cited

U.S. PATENT DOCUMENTS

| | | | |
|---|---|---|---|
| 2,536,970 | 1/1951 | Weast | 99/186 |
| 2,608,489 | 8/1952 | Walker | 99/186 |
| 3,185,576 | 5/1965 | Ross | 426/577 |
| 3,356,512 | 12/1967 | Lemaire et al. | 99/204 |
| 3,563,769 | 2/1971 | Horn | 99/131 |
| 3,656,967 | 4/1972 | Barton et al. | 99/86 |
| 3,676,151 | 7/1972 | Scharschmidt | 99/86 |
| 3,892,871 | 7/1975 | Cooper | 426/577 |
| 3,947,604 | 3/1976 | McGinley | 426/577 |
| 4,387,109 | 6/1983 | Kahn et al. | 426/331 |
| 4,562,080 | 12/1985 | Tenn | 426/94 |

*Primary Examiner*—Jeanette Hunter
*Attorney, Agent, or Firm*—Marshall, O'Toole, Gerstein, Murray & Borun

[57] ABSTRACT

A reduced calorie bakery filling having enriched natural flavor is disclosed. The bakery filling, like a fruit bakery filling, has a substantially reduced level of sweeteners and a reduced level of starch to provide a predetermined reduction in the caloric content. The esthetic properties of the bakery filling are not adversely affected by reducing the amount of sweeteners and starches and the natural flavor of the bakery filling is maintained or enhanced.

6 Claims, No Drawings

REDUCED CALORIE BAKERY FILLINGS

FIELD OF THE INVENTION

The present invention relates to reduced calorie bakery fillings, particularly reduced calorie fruit bakery fillings, having enriched natural flavor.

BACKGROUND OF THE INVENTION

Conventional bakery fillings include relatively high amounts of corn syrup, sugar and starches in order to sufficiently sweeten and sufficiently thicken the bakery filling. Each of these ingredients contribute to the high caloric content of the bakery filling. Accordingly, investigators have attempted to reduce the number of calories in bakery fillings in order to satisfy consumers that desire a sweet and flavorful bakery product, but also desire to limit caloric intake. However, it has proved difficult to develop a bakery filling that responds to various consumer demands for both taste and reduced caloric content.

One proposed method of maintaining the sweetness level of the bakery filling while reducing caloric content is to substitute an artificial sweetener for the sugar and corn syrup. Artificial sweeteners, like saccharin or aspartame, have been successfully incorporated into jams, jellies and fruit toppings to reduce caloric content. However, artificial sweeteners have not been incorporated into bakery fillings because the artificial sweeteners do not provide an acceptable product after baking. In addition, incorporating a sufficiently high amount of an artificial sweetener into a bakery filling interferes with the natural fruit flavor of the bakery filling. A primary consumer demand with respect to bakery fillings is a natural flavor.

Another method of reducing the caloric content of a bakery filling is to use a sweetener that is high in fructose as opposed to using sucrose or a sweetener like corn syrup that is high in dextrose. Fructose provides more sweetness per calorie than either dextrose or sucrose.

Fructose has been used in fruit filings. For example, Tenn, in U.S. Pat. No. 4,562,080, discloses a fruit filling for pastry that is high in fructose. Tenn discloses a high solid fruit filling that includes: 1) about 60% to about 76% corn syrup containing a substantial amount of fructose, and 2) about 22% to about 25% by weight water. In addition, Tenn discloses increasing the starch content of the fruit filling. As will be demonstrated in more detail hereinafter, the present bakery fillings include about 10% to about 35% of a high-fructose corn syrup; include a decreased amount of starch compared to amounts usually present in a bakery filling; and provide a reduced calorie bakery filling with enriched natural flavor.

Cooper U.S. Pat. No. 3,892,871 discloses a fruit jelly that is high in fructose and can include locust bean gum as a gelling agent. The fruit jelly disclosed by Cooper is a spreadable jelly that includes a relatively small amount of fruit compared to a bakery filling. Neither Tenn nor Cooper teach or disclose a bakery filling that has a reduced caloric content and that retains or enhances natural flavor.

Other patents relating to sweetening fruit products and bakery products include Weast U.S. Pat. No. 2,536,970; Walker U.S. Pat. No. 2,608,489; Lemaire et al. U.S. Pat. No. 3,356,512; Horn U.S. Pat. No. 3,563,769; Barton et al. U.S. Pat. No. 3,656,967; and Scharschrnidt U.S. Pat. No. 3,676,151.

As previously stated, conventional bakery fillings are sweetened with corn syrup and sugar (sucrose). The corn syrup is intentionally added to the bakery filling to sweeten the bakery filling. Sugar often is an ingredient in fruit bakery fillings either as an intentionally added ingredient or because fruit component of the bakery filling includes a large amount of sugar. Until the bakery filling of the present invention, no bakery filling has included a high fructose corn syrup as a total replacement for corn syrup, and included non-sugared fruit, to provide a sufficiently sweet bakery filling that includes a caloric content at least one-third less than conventional bakery fillings and that exhibits enriched natural flavor.

In addition, to further assist reducing the caloric content and enriching the flavor of the present bakery fillings, the bakery fillings utilize a food gum as a partial replacement for the food starch that is included in conventional bakery fillings. The food gums, unlike the food starches, are not metabolized, and therefore do not contribute to the caloric content of the bakery filling. Furthermore, the food gum helps reduce masking of the flavor by the food starch, and, in conjunction with the food starch, provides a bakery filling having a commercially acceptable viscosity.

SUMMARY OF THE INVENTION

Conventional bakery fillings include sweeteners having a high caloric content, like corn syrup and sucrose. The bakery fillings also include a starch that adds to the caloric content of the bakery filling. Accordingly, conventional bakery fillings are sufficiently sweet, but not sufficiently low in calories, for individuals desiring a low calorie product that also has an acceptable taste.

In response to this long felt need, the present invention is directed to a reduced calorie bakery filling that is sufficiently sweet, that provides an enriched natural flavor, and that includes at least about one-third less calories than a conventional bakery filling. In particular, the present invention is directed to a bakery filling that substitutes a natural sweetener having a relatively high sweetness to calorie ratio for a conventional natural sweetener having a relatively low sweetness to calorie ratio; that substitutes a food gum or combination of food gums for a portion of the conventional food starches; and that includes a non-sugared fruit component. The bakery filling provides sufficient sweetness, a caloric content that is reduced by at least about one-third, an enriched natural flavor, and acceptable esthetics for commercial use and consumer acceptance.

Therefore, in accordance with one important aspect of the invention, the present bakery filling normally includes a fruit, a sweetening agent, and a food starch, in which:

at least a portion of the sweetening agent has been replaced by an ingredient providing more sweetness per calorie, such that the ingredient comprises about 10% to about 35% by total weight of the bakery filling;

at least a portion of the food starch has been replaced by a food gum, such that the food gum comprises up to about 1% by total weight of the bakery filling and the food starch comprises about 2% to about 8% by total weight of the bakery filling; and the caloric content of the bakery filling is at least a desired percentage less than the caloric content of the normal bakery filling recipe.

In accordance with another important aspect of the present invention, a non-sugared fruit has replaced the sugar-packed fruit included in the normal bakery filling recipe.

Another aspect of the present invention is to provide a bakery filling that demonstrates at least about a one-third reduction in caloric content.

Yet another aspect of the present invention is to provide a bakery filling that has a significantly reduced caloric content and that provides an enriched natural flavor, wherein the conventional corn syrup sweetener has been replaced by a high fructose corn syrup, and wherein the conventional starch has been partially replaced by locust bean gum, a xanthan gum or a combination thereof.

Another aspect of the present invention is to provide an acceptable bakery filling for consumers that desire to reduce caloric or sugar intake, but also desire a sweetened and flavorful bakery filling.

These and other aspects and novel features of the present invention will become apparent from the following detailed description of the preferred embodiments.

DETAILED DESCRIPTION OF THE PREFERRED EMBODIMENTS

Conventional bakery fillings, and particularly fruit bakery fillings, include corn syrup, starches and sugar-packed fruit. Such bakery fillings are sweet, but the natural flavor of the fruit is partially masked by the starch. In addition, individuals desiring to limit caloric intake usually avoid conventional bakery fillings because of the high caloric content of the bakery filling.

Therefore, in accordance with an important feature of the present invention, a bakery filling having reduced caloric content, without a decrease in sweetness and without an adverse affect on flavor, has been developed. In general, the present bakery filling demonstrates at least about a one-third reduction in caloric content without an adverse affect on flavor by: 1) a reduction in the total amount of sweetening agents present in the bakery filling; 2) replacing the corn syrup conventionally used in the bakery filling with high fructose corn syrup; 3) partially replacing the food starch conventionally included in the bakery filling with a food gum; and 4) including non-sugared fruit rather than fruit packed in sugar.

As previously stated, a conventional bakery filling includes corn syrup as a primary sweetener. Corn syrup is a mixture of the carbohydrates dextrose, maltose, and dextrin, and includes about 20% water. The carbohydrate components in corn syrup include about 20% to about 50% monosaccharides (dextrose), about 20% to about 40% disaccharides (maltose), about 10% to about 20% trisaccharides, and about 10% to about 35% other saccharides.

In contrast, high fructose corn syrup has a carbohydrate component including about 40% to about 60% dextrose, about 30% to about 50% fructose and about 5% to about 15% other saccharides. Accordingly, high fructose corn syrup has significantly more sweetness per calorie; is included in the present bakery filling as a total replacement for corn syrup; and is included in the present bakery filling in a lower amount than corn syrup. The present bakery filling therefore includes about 10% to about 35% high fructose corn syrup, by weight of the bakery filling; and the bakery filling is essentially free of corn syrup. It should be understood that corn syrup may be present inadvertently, in small amounts, as an ingredient of another component of the bakery filling.

At the low level of about 10% to about 35% by weight of the bakery filling, the high fructose corn syrup provides sufficient sweetness, even if non-sugared fruit is included in the bakery filling. This amount of high fructose corn syrup also provides a significant decrease in bakery filling caloric content because conventional bakery fillings generally include significantly higher amounts of corn syrup.

In addition to incorporating a high fructose corn syrup into the bakery filling, the present bakery filling includes a food gum as a partial replacement for the food starch conventionally included in a bakery filling. Accordingly, the bakery filling includes up to about 1% by weight of the bakery filling of a food gum, and about 2% to about 8% by weight of the bakery filling of a food starch.

The food starch and food gum are included in the bakery filling to provide an adequate filling viscosity. The food starch is metabolized after ingestion and therefore provides calories. A food gum is not metabolized after ingestion and therefore does not contribute to the caloric content of the bakery filling. Consequently, partially replacing the food starch with a food gum reduces the caloric content of the bakery filling.

It also has been found that the combination of a food starch and a food gum provides a bakery filling having a sufficient viscosity for ease of manufacture and packaging, and for consumer acceptance. The food gum helps rebuild the decreased viscosity resulting from reducing the amount of food starch in the bakery filling. The food gum cannot totally replace the food starch because the gum imparts physical characteristics to the bakery filling different from the starch, thereby making the bakery filling unacceptable commercially. Increasing the amount of food gum increases the viscosity of the bakery filling, however above about 1% by weight of the bakery filling, the food gum provides a product that is too thick for easy handling, and the food gum begins to adversely affect the flavor of the bakery filling. Preferably, the food gum is present at least at 0.05% by weight of the bakery filling to provide a bakery filling having a reduced amount of food starch and a sufficient viscosity.

The food gum included in the present bakery filling is not necessarily limited, and can be any food gum normally used to thicken a food product. Exemplary food gums include, but are not limited to locust bean gum, quince gum, guar gum, gum tragacanth, gum arabic, ghatti, gum karaya, agar, xanthan gums, carrageenan, alginates, and similar food gums, and combinations thereof. Locust bean gum and a xanthan gum are preferred food gums. The food starch included in the bakery filling can be any food starch that is known and used by those skilled in the art of bakery fillings.

The amounts of high fructose corn syrup, starch and food gum included in the bakery filling are judiciously determined to provide a bakery filling having the desired reduction in caloric content, the desired sweetness, and the desired viscosity. A proper selection of the amounts of high fructose corn syrup and food starch provide a bakery filling having the desired reduction in caloric content. The amounts of starch and high fructose corn syrup also can be adjusted to achieve an identical caloric reduction and to provide a bakery filling that: 1) is more viscous but less sweet, or 2) is sweeter but less viscous. The combination of high fructose corn syrup, food starch and food gum provide an acceptable balance between bakery filling sweetness, viscosity and reduction in caloric content.

In accordance with another important feature of the present invention, the bakery filling includes a non-sugared fruit as opposed to a conventional bakery filling that includes a fruit packaged in sugar. The significant reduction in sugar content allows enrichment of the natural fruit flavors such that the fruit flavor is more perceptible to the consumer.

By including a non-sugared fruit in the bakery filling, more fruit can be included in the bakery filling up to an amount determined by cost, flavor and caloric content considerations. The fruit component of the bakery filling can be cherry, raspberry, blueberry, apple, peach, blackberry, boysenberry, dewberry, quince, plum, pineapple, lemon, strawberry, current, and similar fruit components. In addition, the present bakery filling can include a non-fruit filling such as Bavarian Creme or creme cheese and still achieve a desired reduction in calories compared to a conventional bakery filling recipe, without an adverse affect on flavor or other esthetic properties.

The present bakery fillings also include a flavor, either natural or artificial, a color and a preservative. Preferably, the flavor is a natural flavor to impart more enhanced flavor properties to the bakery filling. Colors are added to improve and maintain the esthetics of the bakery filling over the shelf life of the product. The amount and type of flavor and color can be varied with regard to cost constraints and desired shelf-life. Other ingredients known to those skilled in the art also can be included in the reduced calorie bakery fillings to perform their intended function.

To demonstrate the reduced calorie bakery fillings of the present invention, the following Examples 1 through 5 were prepared and compared to a conventional bakery filling recipe for caloric content. In the following Examples, the term "calories/gram" refer to calories per gram of bakery filling. The caloric content was determined from the amount and type of each ingredient included in the bakery filling. In each Example, the caloric content of the reduced calorie bakery filling was one-third lower than the caloric content of the conventional bakery filling. In each Example, the "Reduced Calorie Filling" is a bakery filling of the present invention, whereas the "Comparative Standard Filling Recipe" is a present day bakery filling included for comparative purposes.

EXAMPLE 1

Cherry Bakery Filling

| Ingredients (by wt.) | Reduced Calorie Cherry Filling | Comparative Conventional Cherry Filling Recipe |
|---|---|---|
| Fructose 55[1] | 105.70 | 53.90 |
| Keltrol[2] | 0.35 | — |
| Locust Bean Gum | 0.35 | — |
| RSP Cherries 5 + 1[3] | — | 170.10 |
| IQF Cherry Halves[4] | 160.00 | — |
| Red #40 Granules[5] | 0.10 | 0.11 |
| Sodium Benzoate[6] | 0.50 | 0.50 |
| Potassium Sorbate[6] | 0.25 | 0.25 |
| Salt | — | 0.80 |
| Starch[7] | 26.00 | 29.80 |
| Water | 201.50 | 149.30 |
| Citric Acid | 0.25 | 1.42 |
| Corn Syrup 44[8] | — | 93.50 |
| Propylene Glycol | — | 0.30 |
| Artificial Flavor | — | 0.02 |
| Natural Flavor #1[9] | 2.50 | — |
| Natural Flavor #2[9] | 2.50 | — |
| Total (weight) | 500.00 | 500.00 |
| calories/gram | 1.01 | 1.52 |

[1] A high fructose corn syrup;
[2] A xanthan gum available from Kelco Div. of Merck & Co., San Diego, CA;
[3] Sugar packed cherries, including 5 parts cherries and 1 part sugar; RSP denotes Red Sour Pitted;
[4] Non-sugar packed cherries; IQF denotes Individual Quick Frozen;
[5] Color;
[6] Preservatives;
[7] Food starch, a modified waxy maize food starch, available from National Starch Co.;
[8] Conventional corn syrup; and
[9] Natural fruit flavor.

The reduced calorie cherry bakery filling of Example 1 included 33.55% fewer calories per gram than the standard cherry filling recipe. The bakery filling of Example 1 included 21.1% by weight total sweeteners (high fructose corn syrup) whereas the standard cherry bakery filling included 35.2% by weight total sweeteners (corn syrup, sugar in the sugar packed cherries and high fructose corn syrup). The reduced calorie cherry filling included about 12.8% less of food starch than the standard cherry filling recipe. The bakery filling of Example 1 has a sufficient viscosity and provided an enriched natural cherry flavor.

EXAMPLE 2

Raspberry Bakery Filling

| Ingredients (by wt.) | Reduced Calorie Raspberry Filling | Comparative Standard Raspberry Filling Recipe |
|---|---|---|
| Corn Syrup[8] | — | 109.75 |
| Fructose[1] | 114.40 | 76.55 |
| Keltrol[2] | 0.25 | 0.36 |
| Locust Bean Gum | 0.25 | 0.36 |
| Red #40 Granules[5] | 0.10 | 0.04 |
| Blue #1 (0.3% aq. sol'n)[5] | — | 0.10 |
| Sodium Benzoate[6] | 0.50 | 0.50 |
| Potassium Sorbate[6] | 0.25 | 0.25 |
| Salt | 0.25 | 0.77 |
| Raspberries W/Seeds | 100.00 | 100.00 |
| Starch[7] | 30.00 | 32.70 |
| Water | 251.00 | 177.80 |
| Citric Acid | 0.50 | 0.71 |
| Propylene Glycol | — | 0.10 |
| Artificial Flavor | — | 0.01 |
| Raspberry Flavor[9] | 2.50 | — |
| Total (weight) | 500.00 | 500.00 |
| calories/gram | 1.01 | 1.51 |

The reduced calorie raspberry bakery filling of Example 2 included 33.11% fewer calories per gram than the standard raspberry filling recipe. The bakery filling of Example 2 included 22.9% by weight total sweeteners (high fructose corn syrup) whereas the standard raspberry bakery filling included 31.86% by weight total sweeteners (corn syrup and high fructose corn syrup). The reduced calorie raspberry bakery filling included about 8.2% less food starch and 30.6% less food gum. The reduced calorie raspberry filling of Example 2 has a sufficient viscosity and provided an enriched natural raspberry flavor.

EXAMPLE 3

Blueberry Bakery Filling

| Ingredients (by wt.) | Reduced Calorie Blueberry Filling | Comparative Standard Blueberry Filling Recipe |
| --- | --- | --- |
| Corn Syrup 44[8] | — | 119.62 |
| Fructose 55[1] | 119.36 | 86.53 |
| Keltrol[2] | 0.20 | 0.36 |
| Locust Bean Gum | 0.20 | 0.36 |
| Water | 222.32 | 188.32 |
| Red #40 Granules[5] | 0.03 | — |
| Blue #1 (0.3% aq. sol'n.)[5] | 0.10 | — |
| Evaporated Apples (5/64" Grind) | — | 12.73 |
| Apple Chips (⅛"-¼") | 10.00 | 61.08 |
| Wild Maine Blueberries | 120.00 | 61.08 |
| Sodium Benzoate[6] | 0.50 | 0.46 |
| Potassium Sorbate[6] | 0.25 | 0.23 |
| Salt | 0.20 | 0.51 |
| Starch[7] | 25.00 | 28.50 |
| Citric Acid | 1.10 | 1.04 |
| Propylene Glycol | — | 0.13 |
| Artificial Flavor | — | 0.13 |
| Blueberry Flavor[9] | 0.75 | — |
|  | 63.86 | 86.53 |
| Total (weight) | 500.00 | 500.00 |
| calories/gram | 1.08 | 1.62 |

The reduced calorie blueberry bakery filling of Example 3 included 33.33% fewer calories per gram than the standard blueberry filling recipe. The reduced calorie bakery filling of Example 3 included 23.9% by weight total sweeteners (high fructose corn syrup), whereas the standard blueberry bakery filling included 41.2% by weight total sweeteners (corn syrup and high fructose corn syrup). The reduced calorie blueberry filling also included about 12.3% less food starch and about 44.4% less food gum. The bakery filling of Example 3 had a sufficient viscosity and provided an enriched natural blueberry flavor.

EXAMPLE 4

Bakery Filling

| Ingredients (by wt.) | Reduced Calorie Apple Filling | Comparative Standard Apple Filling Recipe |
| --- | --- | --- |
| Corn Syrup 44[8] | — | 150.40 |
| Fructose 55[1] | 93.00 | 154.03 |
| Keltrol[2] | 0.20 | 0.25 |
| Locust Bean Gum | 0.20 | 0.25 |
| Sodium Benzoate[6] | 0.50 | 1.00 |
| Potassium Sorbate[6] | 0.50 | 1.00 |
| Regent Phosphate | — | 0.40 |
| Evaporated Apples | 55.00 | 138.65 |
| Water | 333.30 | 517.60 |
| Starch[7] | 15.00 | 31.10 |
| Salt | 0.25 | 1.10 |
| Citric Acid | 1.50 | 3.45 |
| Cinnamon | 0.25 | 0.45 |
| Propylene Glycol | — | 0.30 |
| Dolorcoresin Cinnamon Flavor[9] | 0.30 | 0.02 |
| Total (weight) | 500.00 | 1000.00 |
| calories/gram | 0.93 | 1.39 |

The reduced calorie apple filling of Example 4 included 33.09% fewer calories per gram than the standard apple filling recipe. The reduced calorie bakery filling of Example 4 included 18.6% by weight total sweeteners (high fructose corn syrup) whereas the standard apple bakery filling included 30.4% by weight total sweeteners (corn syrup and high fructose corn syrup). The reduced calorie apple filling also included 3.5% less food starch, but includes a greater amount of food gum. The bakery filling of Example 4 had a sufficient viscosity and provided an enriched natural apple flavor.

EXAMPLE 5

Peach Bakery Filling

| Ingredients (by wt.) | Reduced Calorie Peach Filling | Comparative Standard Peach Filling Recipe |
| --- | --- | --- |
| Water | 326.00 | 188.23 |
| Keltrol[2] | 0.65 | — |
| Locust Bean Gum | 0.65 | — |
| Evaporated Apples (5/64 Grind) | — | 63.05 |
| Diced Rio Peaches (7 + 1)[10] | — | 14.40 |
| IQF Diced Peaches[11] | 360.00 | — |
| Sodium Benzoate[6] | 1.00 | 0.45 |
| Potassium Sorbate[6] | 0.50 | 0.23 |
| Salt | 1.00 | 0.54 |
| Yellow #6 Powder[5] | — | 0.02 |
| Yellow #6 Sol'n.[5] | 0.20 | — |
| Corn Syrup 44[8] | — | 82.86 |
| Fructose 55[1] | 261.40 | 119.80 |
| Starch[7] | 44.00 | 25.22 |
| Citric Acid | 2.40 | 2.52 |
| Sodium Citrate | — | 2.52 |
| Propylene Glycol | 0.20 | 0.13 |
| Artificial Flavor | — | 0.03 |
| Peach Flavor[9] | 2.00 | — |
| Total (weight) | 1,000.00 | 500.00 |
| calories/gram | 1.08 | 1.80 |

[10]Sugar packed peaches, including 7 parts peaches and 1 part sugar; and
[11]Non-sugar packed peaches; IQF denoted Individual Quick Frozen.

The reduced calorie peach filling of Example 5 included 40.0% fewer calories per gram than the standard peach filling recipe. The bakery filling of Example 5 included 26.14% by weight total sweeteners (high fructose corn syrup), whereas the standard peach bakery filling included 40.89% total sweeteners (corn syrup, high fructose corn syrup and sugar in the sugar packed peaches). The reduced calorie peach filling included about 12.7% less food starch than the standard peach filling recipe. The bakery filling of Example 5 had a sufficient viscosity and provided an enriched natural peach flavor.

The above Examples demonstrate the new reduced calorie bakery fillings of the present invention. The reduced calorie bakery fillings have a reduced sugar level, thereby reducing the caloric content and improving the taste impact of the fruit flavor; have partially substituted the food starch with a food gum, thereby reducing the caloric content and reducing flavor masking by the starch; include no artificial sweeteners or flavors that to date have been included in every type of reduced calorie product that is sweetened.

Obviously, many modifications and variations of the invention as hereinbefore set forth can be made without departing from the scope thereof and therefore only such limitations should be imposed as are indicated by the appended claims.

What is claimed is:

1. A reduced calorie bakery filling comprising:
   (i) about 10% to about 35% by weight of a sweetener, said sweetener consisting essentially of a high fructose corn syrup said high fructose corn syrup comprising about 40% to about 60% dextrose, about 30% to about 50% fructose and about 5% to about 15% other saccharides;
   (ii) about 2% to about 8% by weight of a food starch; and
   (iii) about 0.05% to about 1% by weight of a food gum,
   wherein said reduced calorie bakery filling has less than 60% by weight total solids,
   and wherein said reduced calorie bakery filling has 1.08 calories or less per gram.

2. The bakery filling of claim 1 further comprising about 5% to about 50% by weight of a non-sugared fruit.

3. In a bakery filling containing a fruit, a sweetening agent, and a food starch, the improvement comprising:
   replacing the sweetening agent with a high fructose corn syrup comprising about 40% to about 60% dextrose, about 30% to about 50% fructose and about 5% to about 15% other saccharides in an amount of about 10% to about 35% by total weight of the bakery filling and such that the bakery filling is essentially free of the sweetening agent; and
   replacing a portion of the food starch by a food gum, such that the food gum comprises up to about 1% by total weight of the bakery filling, and the food starch comprises about 2% to about 8% by total weight of the bakery filling;
   wherein the bakery filling has less than 60% by weight total solids;
   and wherein the caloric content of the bakery filling is 1.08 calories or less per gram and is at least a desired percentage less than the caloric content of the normal bakery filling recipe.

4. (Amended) The bakery filling of claim 3 wherein the fruit in the normal recipe is a sugar-packed fruit and has been replaced by non-sugared fruit.

5. The bakery filling of claim 3 wherein the starch in the normal recipe has been partially replaced by locust bean gum, quince gum, guar gum, gum tragacanth, gum arabic, ghatti, gum karaya, a xanthan gum, agar, carrageenan, an alginate, or combinations thereof.

6. The bakery filling of claim 3 having a caloric content at least about one-third lower than the caloric content of the normal recipe.

* * * * *

UNITED STATES PATENT AND TRADEMARK OFFICE
CERTIFICATE OF CORRECTION

PATENT NO. : 5,356,653

DATED : October 18, 1994

INVENTOR(S) : Patrick J. Lathrop

It is certified that error appears in the above-identified patent and that said Letters Patent is hereby corrected as shown below:

Column 2, line 8, "because fruit" should be --because the fruit--.

Column 6, line 19, "7)" should be --6)--.

Column 8, line 49, "500.00" should be --500.00--.

Column 10, line 21, "(Amended)" should be deleted.

Signed and Sealed this

Twentieth Day of December, 1994

Attest:

BRUCE LEHMAN

*Attesting Officer*     *Commissioner of Patents and Trademarks*